United States Patent
Ji et al.

(10) Patent No.: US 8,219,116 B1
(45) Date of Patent: Jul. 10, 2012

(54) WIRELESS BASE STATION LOCATION ESTIMATION

(75) Inventors: Zhengrong Ji, Sunnyvale, CA (US); Adel Amin Youssef, Santa Clara, CA (US); Michael Jesse Chu, Los Altos Hills, CA (US); Steven John Lee, San Francisco, CA (US); Ravi Jain, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 715 days.

(21) Appl. No.: 12/323,622

(22) Filed: Nov. 26, 2008

Related U.S. Application Data (60) Provisional application No. 60/990,597, filed on Nov. 27, 2007, provisional application No. 61/196,167, filed on Oct. 15, 2008, provisional application No. 60/990,569, filed on Nov. 27, 2007.

(51) Int. Cl.
*H04W 24/00* (2009.01)
*H04W 36/00* (2009.01)

(52) U.S. Cl. .................. 455/456.6; 455/456.5; 455/443

(58) Field of Classification Search ............... 455/456.5, 455/456.6, 443
See application file for complete search history.

(56) References Cited

U.S. PATENT DOCUMENTS

| | | | | |
|---|---|---|---|---|
| 2002/0094821 | A1* | 7/2002 | Kennedy, Jr. ............... | 455/456 |
| 2002/0135516 | A1* | 9/2002 | Sollenberger et al. ........ | 342/387 |
| 2004/0152470 | A1* | 8/2004 | Spain ......................... | 455/456.1 |
| 2004/0259573 | A1* | 12/2004 | Cheng ......................... | 455/456.3 |
| 2005/0182561 | A1* | 8/2005 | Yamada et al. ............... | 701/209 |
| 2005/0282540 | A1* | 12/2005 | Motamedi et al. ............ | 455/423 |
| 2006/0009223 | A1* | 1/2006 | Kiviranta et al. ............ | 455/436 |
| 2006/0089154 | A1* | 4/2006 | Laroia et al. ............... | 455/456.2 |
| 2006/0119516 | A1* | 6/2006 | Krumm et al. ............... | 342/451 |
| 2008/0004037 | A1* | 1/2008 | Achlioptas et al. ........ | 455/456.1 |

OTHER PUBLICATIONS

Web ProForum Tutorials., "Global System for Mobile Communication (GSM)," *International Engineering Consortium*, Dec. 2005; pp. 1-19.

* cited by examiner

*Primary Examiner* — Ariel Balaoing
(74) *Attorney, Agent, or Firm* — Sterne, Kessler, Goldstein & Fox P.L.L.C.

(57) ABSTRACT

A wireless base station allows a mobile device to communicate with a wireless network. An estimate of the location of the wireless base station may allow a location based service to determine the location of a mobile device. In an embodiment, location may be estimated using a collection of data samples obtained from a mobile device. These data samples may contain carrier related timing information, for example GSM (Global System for Mobile Communications) timing information and received signal strength indication (RSSI). Data from the GSM timing information and RSSI may be analyzed to estimate a distance of a mobile device from a wireless base station. In another embodiment, a centroid of the data samples is computed. The centroid may then be used to estimate the direction of a cell phone tower relative to the centroid. In this way, using an estimate of distance and direction, location of wireless base station may be estimated.

5 Claims, 11 Drawing Sheets

WIRELESS BASE STATION LOCATION ESTIMATION

CROSS REFERENCE TO RELATED APPLICATIONS

This patent application claims the benefit of U.S. Provisional Patent Application No. 60/990,597, filed on Nov. 27, 2007, entitled "Wireless Base Station Location Estimation", U.S. Provisional Patent Application No. 61/196,167, filed on Oct. 15, 2008, entitled "Wireless Network-Based Location Approximation", and U.S. Provisional Patent Application No. 60/990,569, filed on Nov. 27, 2007, entitled "Locating Electronic Devices Using Passive Radios", all of which are incorporated by reference herein in their entireties.

BACKGROUND

1. Technical Field

The invention relates to wireless communication.

2. Related Art

Information on locations of various wireless base stations (e.g. cell towers) is usually only available to mobile service providers that use the wireless base stations or other entities responsible for the wireless base stations. Further, even mobile service providers may not have knowledge of the locations of many wireless base stations outside of their own networks.

For at least these reasons, it has been difficult to get complete information on the locations of various wireless base stations. Estimated wireless base station location information is needed for any geographical region of interest regardless of which mobile service provider is providing coverage.

What is needed are at least systems and methods for estimating locations of various wireless base stations.

BRIEF SUMMARY

This description relates to systems and methods for estimating a location of a wireless base station. A wireless base station allows a mobile device to communicate with a wireless network. An estimate of the location of the wireless base station may allow a location-based service (LBS) to determine the location of a mobile device.

In an embodiment, the location of a wireless base station may be estimated using a collection of data samples obtained from a mobile device. These data samples may contain carrier related timing information, for example GSM (Global System for Mobile Communications) timing information and received signal strength indication (RSSI). Data from the GSM timing information and a RSSI may be analyzed to estimate a distance of a mobile device from a wireless base station.

In another embodiment, a centroid of the data samples is computed. The centroid may then be used to estimate the direction of a cell phone tower relative to the centroid.

In this way, using a value of distance and a direction, the location of a wireless base station may be estimated.

Further embodiments, features, and advantages of the invention, as well as the structure and operation of the various embodiments of the invention are described in detail below with reference to accompanying drawings

BRIEF DESCRIPTION OF THE DRAWINGS/FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

This detailed description describes systems and methods for estimating the location of a wireless base station. The location of a wireless base station may be determined based on data obtained from one or more mobile devices.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This description is divided into several sections, illustrated by the following table of contents.

| Table of Contents | |
|---|---|
| I. | Overview |
| II. | Data Acquisition |
| III. | Statistical Filtering |
| IV. | Centroid Computation |
| V. | Distance Calculation |
| VI. | Direction Calculation |
| VII. | Use of Signal Propagation Models |
| VIII. | Other Methods and Validation |
| IX. | Example Computer Embodiment |

I. Overview

The systems and techniques described herein relate to estimating the location of a cell phone tower based on information obtained from a mobile device.

Figure 1:
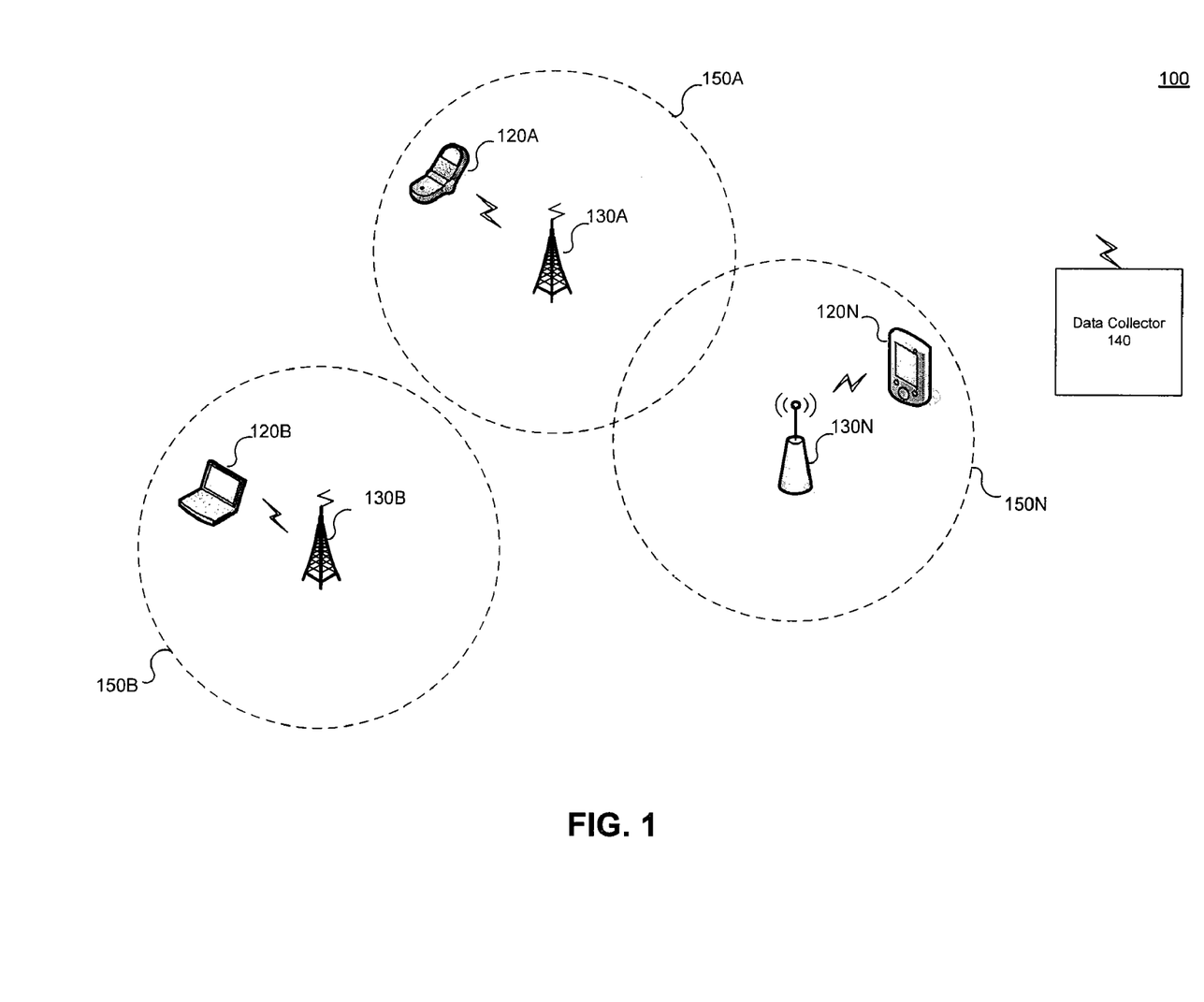
FIG. 1 is a conceptual diagram of a network illustrating various mobile devices in a mobile environment.

FIG. 1 illustrates a conceptual representation of network 100. Network 100 comprises various mobile devices 120A-N and wireless base stations 130A-N. Network 100 may be a GSM, TDMA or a CDMA technology enabled mobile network or any form of wireless network (e.g. IEEE 802.11, Bluetooth or other Wi-Fi networks) or a combination of a wired and wireless networks. Although in the following description, GSM networks are used as an example, it is to be noted that the description is not limited to GSM networks. Although three mobile devices and wireless base stations are illustrated for exemplary purposes, network 100 may comprise any number of mobile devices and wireless base stations. Network 100 may be used to transmit and receive signals including but not limited to WiFi, Bluetooth, or cellular signals. In an example, each device associated with network 100 may transmit and receive data (packets) according to a known protocol in a segment (channel) of allotted portion the spectrum (frequency band). For instance, the IEEE 102.11 series of protocols specifies the format of various types of packets which may be transmitted in preset channels of the spectrum, such as the ISM band located in the 2.4 GHz frequency range or the public safety band located in the 4.9 GHz frequency range.

Mobile devices 120A-N may include any device that is configured to exchange any form of data over a wireless network. Each mobile device 120A-N communicates with wireless base stations 130A-N. Wireless base stations 130A-N allow mobile devices 120A-N to communicate over network 100 or any other network connected to network 100. In an embodiment, passive radio location technology can be provided for mobile devices 120A-N to get its approximate location information (e.g., metropolitan area, or latitude and longitude data) without GPS capability. Additionally, the passive radio location technology, in certain implementations, can avoid the urban-canyon and inside-the-building problems associated with GPS technology because it uses ubiquitous wireless signals rather than GPS signals from satellites. Passive radio technology is described further in U.S. Provisional Patent Application No. 60/990,569, filed on Nov. 27, 2007, entitled "Locating Electronic Devices Using Passive Radios", which is incorporated herein by reference in its entirety.

In an embodiment, mobile devices 120A-N may be configured to observe or capture data packets transmitted to or from wireless base station 130A-N. By way of example, the mobile devices 120A-N may be laptops having a wireless transceiver that can operate in a "sniffer" or "monitor" mode, thereby handling data packets without requiring the mobile devices 120 A-N to be associated with any one of wireless base station 130A-N. As an example, the data packets may include data frames which may be analyzed by mobile devices 120A-N. Analysis and processing of data frames by mobile devices 120A-N is described further in U.S. Provisional Patent Application No. 61/196,167, filed on Oct. 15, 2008, entitled "Wireless Network-Based Location Approximation", which is incorporated herein by reference in its entirety.

Each wireless base station 130A-N may be a form of radio receiver or transmitter that serves as a hub of network 100. Each wireless base station 130A-N may also be the gateway between a wired network and network 100, or any other network and network 100. In an embodiment, each wireless base station 130A-N may be a Wi-Fi router or any other form of wireless communication hub. In another example, wireless base station 130A-N may be a wireless router that can support several client devices or more, while some wireless base stations may act as signal repeaters.

Data collector 140 may be any form of device that obtains and analyzes information from mobile device(s) 120A-N through network 100. In an embodiment, data collector 140 may be a server at a remote location, that may provide location based service(s) (LBS) to mobile device(s) 120A-N. Data collector 140 may communicate with mobile devices 120A-N and wireless base station(s) 130A-N using wireless transmission. In particular, data collector 140 sends signals to mobile devices 120A-N, informing them of the location of wireless base stations 130A-N.

The regions 150A-C provide a conceptual illustration of areas transmission and reception for wireless base station(s) 130A-N. As shown in FIG. 1, areas of transmission and reception may overlap as shown by regions 150A and 150C. The boundaries of regions 150A-C are illustrative and are not intended to limit the physical regions of reception and transmission.

Figure 2:
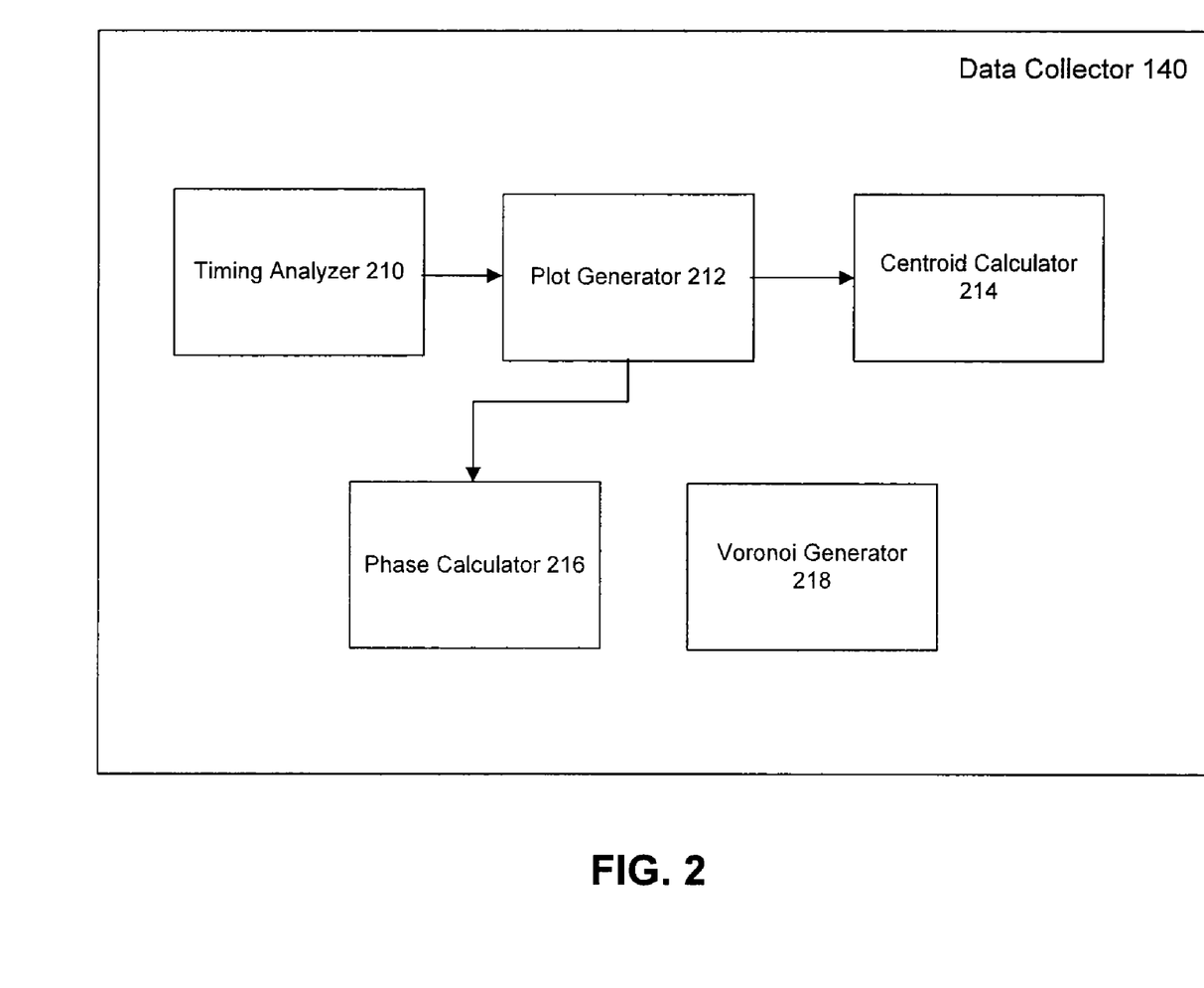
FIG. 2 is an architecture diagram of a data collector in an embodiment of the invention.

FIG. 2 illustrates data collector 140 in an embodiment of the invention. In this embodiment, data collector 140 comprises timing analyzer 210, plot generator 212, centroid calculator 214, phase calculator 216 and Voronoi generator 218. The operation of timing analyzer 210, plot generator 212, centroid calculator 214, phase calculator 216 and Voronoi generator 218 is explained in detail further in the description.

II. Data Acquisition

In what may be called the data acquisition phase, data collector 140 initiates a collection event in an embodiment of the invention. A collection event allows the data collector 140 to obtain data from one or more mobile device(s) 120A-N. In an embodiment, this data includes GPS data and GSM control information. GPS data is usually obtained if mobile device 120A-N is enabled to communicate with GPS satellites.

In another embodiment, one or more mobile device(s) 120A-N may initiate a collection event to provide data to data collector 140.

In a collection event, one or more data samples are obtained by data collector 140 from one or more mobile device(s) 120A-N. A data sample may comprise mobile device parameters such as a mobile network code (MNC), mobile country code (MCC), location area code (LAC) and cell ID (CID). Cell ID may be an identifier assigned to a wireless base station 130A-N in network 100. In embodiments where a mobile device is GPS enabled, a data sample may contain an indication of the mobile device's location. In another embodiment, passive radio can be used to detect CIDs by scanning and decoding control channel information embedded in wireless signals.

In one implementation, a database of CID information and corresponding location information for wireless base station 130A-N can be maintained. For example, the database can be generated based on a map of known and identified wireless landmarks. Additionally, the map of wireless landmarks can be created based on publicly available information (e.g., WIGLE.net) or proprietary techniques. Furthermore, a map of wireless landmarks and its corresponding database can be updated periodically to account for wireless landmarks that have been deleted or added. An example of such a database is described further in U.S. Provisional Patent Application No. 60/990,569, filed on Nov. 27, 2007, entitled "Locating Electronic Devices Using Passive Radios", which is incorporated herein by reference in its entirety. In an example, the CID information can be stored on the mobile device 120A-N until the data can be uploaded to a server, and the location calculation can be performed by the server. In this manner, the electronic device does not need to have additional memory storage space for maintaining a database of location information for CIDs.

CIDs contained in data samples may be obtained by scanning and decoding control channel information embedded in wireless signals in network 100. For example, suppose the wireless signals are cellular signals using the GSM standard, then data collector 140 can scan for broadcast control channel (BCCH) information in all possible GSM frequency ranges (e.g., 850/900 MHz or 1800/1900 MHz). Additionally, a data sample obtained by data collector 140 may comprise a received signal strength indication (RSSI).

Figure 3:
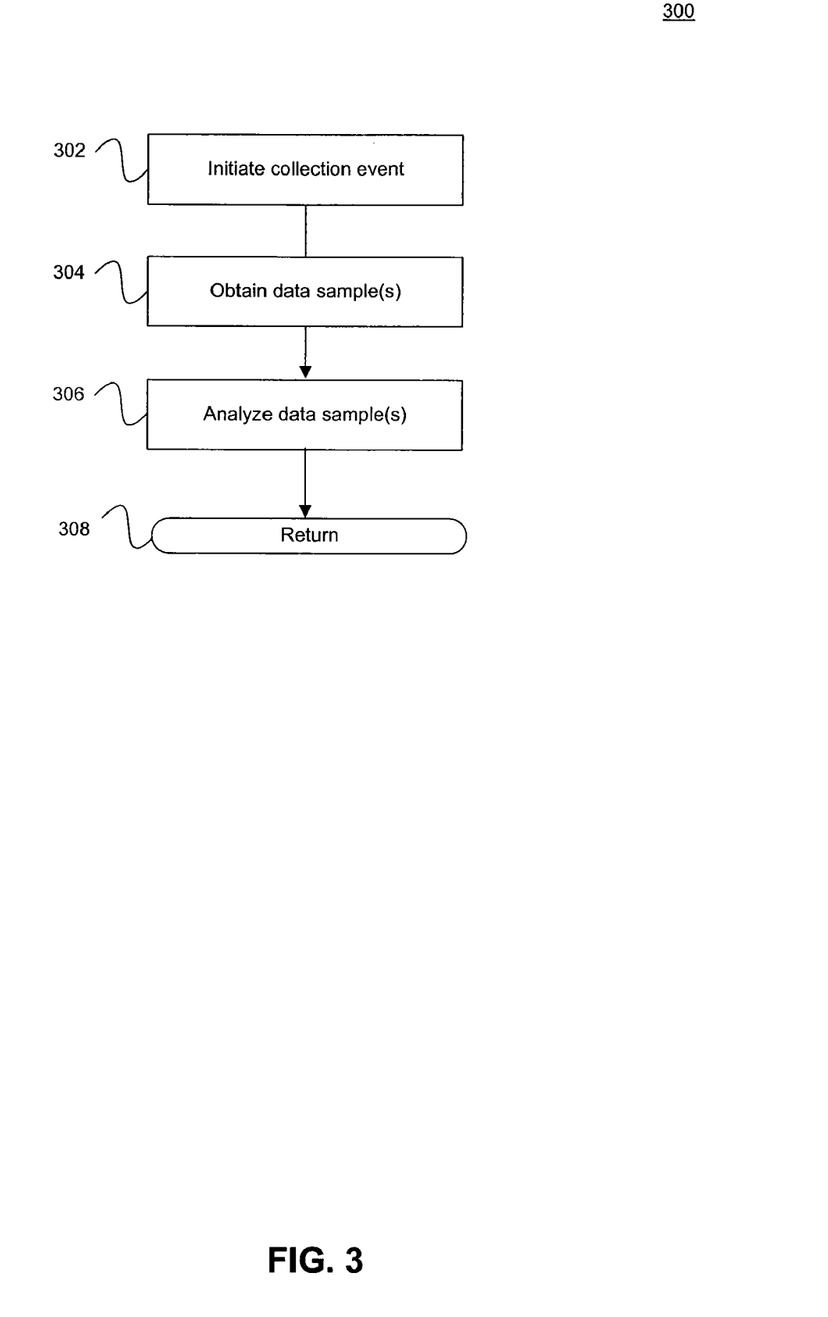
FIG. 3 is a flowchart illustrating a method of obtaining and analyzing data samples in an embodiment of the invention.

FIG. 3 illustrates method 300 for obtaining data sample(s) in an embodiment of the invention. Method 300 begins with a data collector initiating a collection event (stage 302). As an example, data collector 140 may initiate a collection event. One or more data sample(s) comprising a value of MNC, MCC, LAC and CID and other information such as GPS readings and RSSI is obtained (stage 304). A data collector may analyze the information in a data sample (stage 306) and method 300 concludes (stage 308).

In this way, data collector 140 may obtain data sample(s) from one or more mobile device(s) 120A-N.

III. Statistical Filtering

In an embodiment, data samples obtained from mobile device(s) 120A-N may be filtered by data collector 140. Filtering may include a form of spatial or temporal filtering by data collector 140.

Spatial or temporal filtering may allow statistical unbiased sampling of data and may improve accuracy of any further processing carried out by data collector 140 on data sample(s). Filtering may also increase accuracy of data samples obtained from mobile device(s) 120A-N.

IV. Centroid Computation

In an embodiment, a centroid is computed for the data samples that are collected by data collector 140 in a collection event.

As an example, to compute a value of a centroid, the data samples may be plotted on a two dimensional plane based on the geographical location of mobile devices 120A-N at a time of initiation of a collection event by data collector 140. Data samples may be plotted by plot generator 212 in data collector 140. The centroid may then be computed by centroid calculator 214 in data collector 140 by calculating an average value of all the 'x' co-ordinates of a data sample and the 'y' co-ordinates of the data sample. The average 'x' and 'y' co-ordinate values are the co-ordinates of the centroid. The 'x' and 'y' co-ordinates may also be latitude and longitude values respectively.

Figure 4:
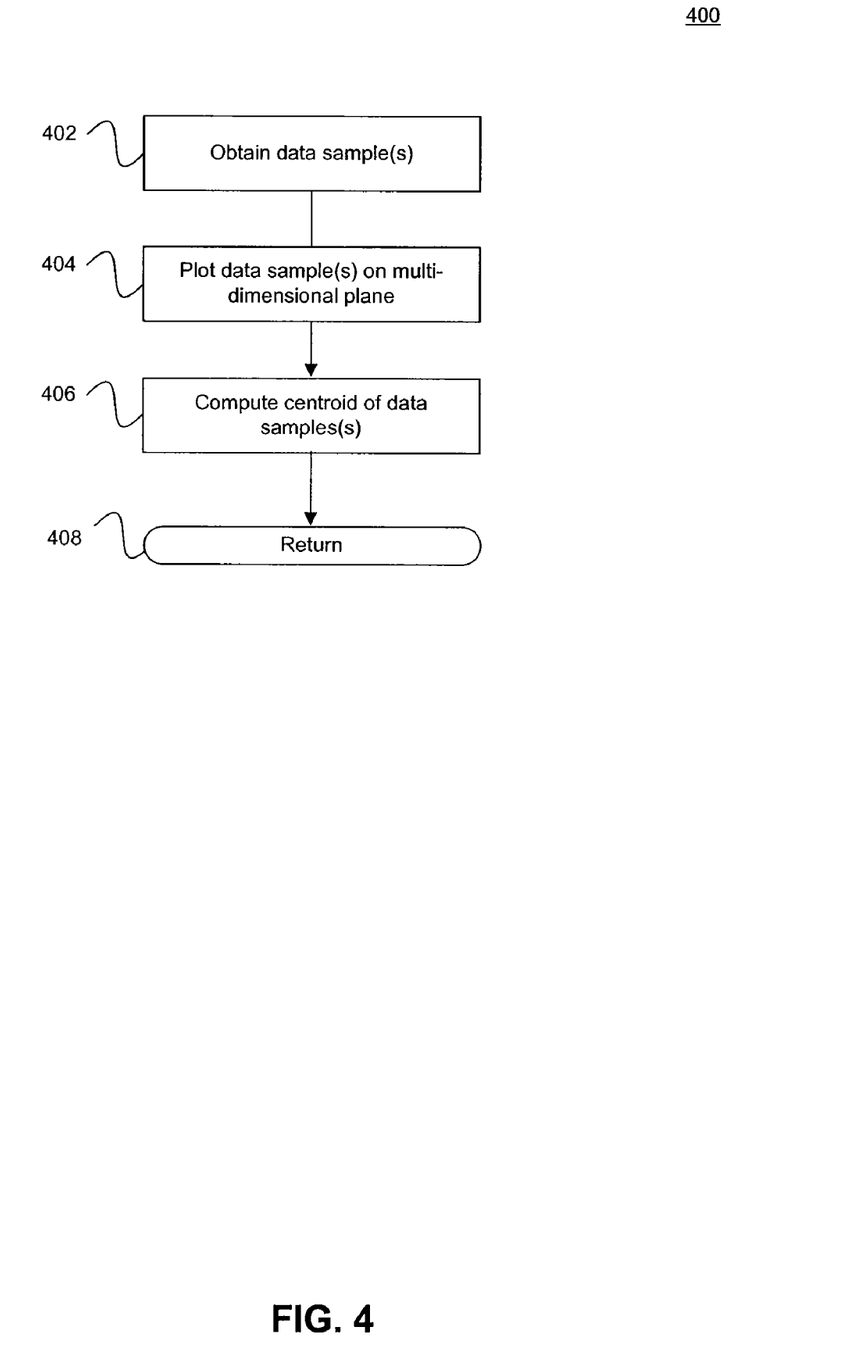
FIG. 4 is a flowchart illustrating a method of computing a centroid of data samples in an embodiment of the invention.

FIG. 4 illustrates method 400 for calculating a value of a centroid in an embodiment of the invention. Method 400 begins with obtaining a set of data samples (stage 402). The data samples obtained in stage 402 may be plotted on a multi-dimensional plane (stage 404). As an example the data samples may be plotted on a two-dimensional plane. The average value of the co-ordinates of the data samples is computed and plotted on the multi-dimensional plane to determine a centroid of the data samples (stage 406) and method 400 concludes (stage 408).

In this way, a centroid of data samples is computed in an embodiment. The value of the centroid may be used to estimate a direction of wireless base station 130*j* as explained further in this description.

V. Distance Calculation

In an embodiment, to estimate distance between a mobile device 120*i* from a wireless base station 130*j* (where i and j may be any value from A through N), GSM synchronization signals or BCCH control channel data may be used. In some cases, a wireless base station 130*j* may transmit synchronization data to mobile device 120*i*. Mobile device 120*i* may record the time of arrival of such synchronization data. Furthermore, from the time of arrival of synchronization data mobile device 120*i* may determine a value of a time offset that may be needed to synchronize mobile device 120*i* with wireless base station 130*j*.

In an embodiment, a time offset determined by mobile device 120*i* is obtained from all filtered data samples. Multilateration and statistical averaging or interpolation techniques can then be employed to estimate the distance between the centroid computed earlier and a wireless base station 130*j* (where j may be any value from A through N).

In another embodiment, instance, the data rate may be used as an estimate of channel quality to indicate the physical separation between mobile device 120A-N and wireless base station 130A-N. In one example, a look-up table may be used to estimate the distance, an example of which is described in U.S. Provisional Patent Application No. 61/196,167, filed on Oct. 15, 2008, entitled "Wireless Network-Based Location Approximation", which is incorporated herein by reference in its entirety.

Figure 5:
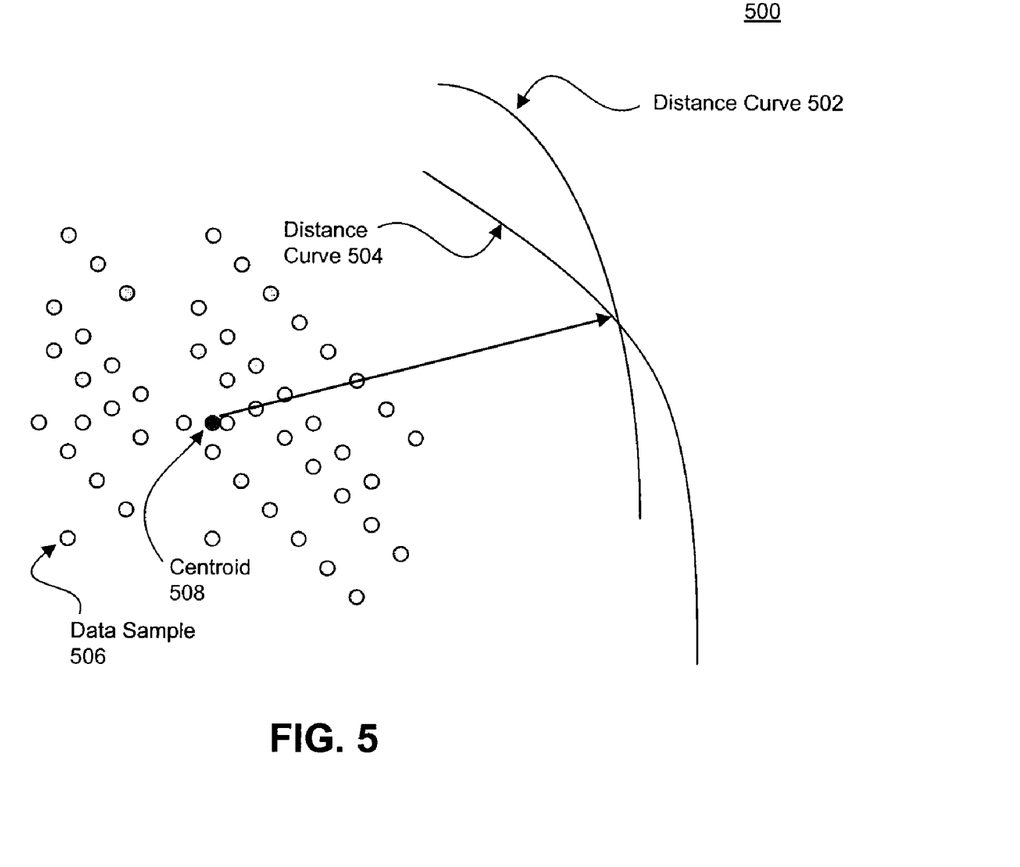
FIG. 5 is a diagram illustrating distance curves that are generated in an embodiment of the invention.

FIG. 5 illustrates exemplary distance curves 502 and 504. Distance curves 502 and 504 may be based on offset information and location of the data samples. In an embodiment, distance curves 502 and 504 are generated by data collector 140. The distance curves can be plotted by plot generator 212 based on offset information or combination of RSSI values and signal propagation models.

In an embodiment, plot generator 212 overlays and computes a value of intersection between distance curve 502 and distance curve 504. This value of intersection is used to estimate distance between a wireless base station 130*j* (where j may be a value from A through N) and a centroid 508.

Figure 6:
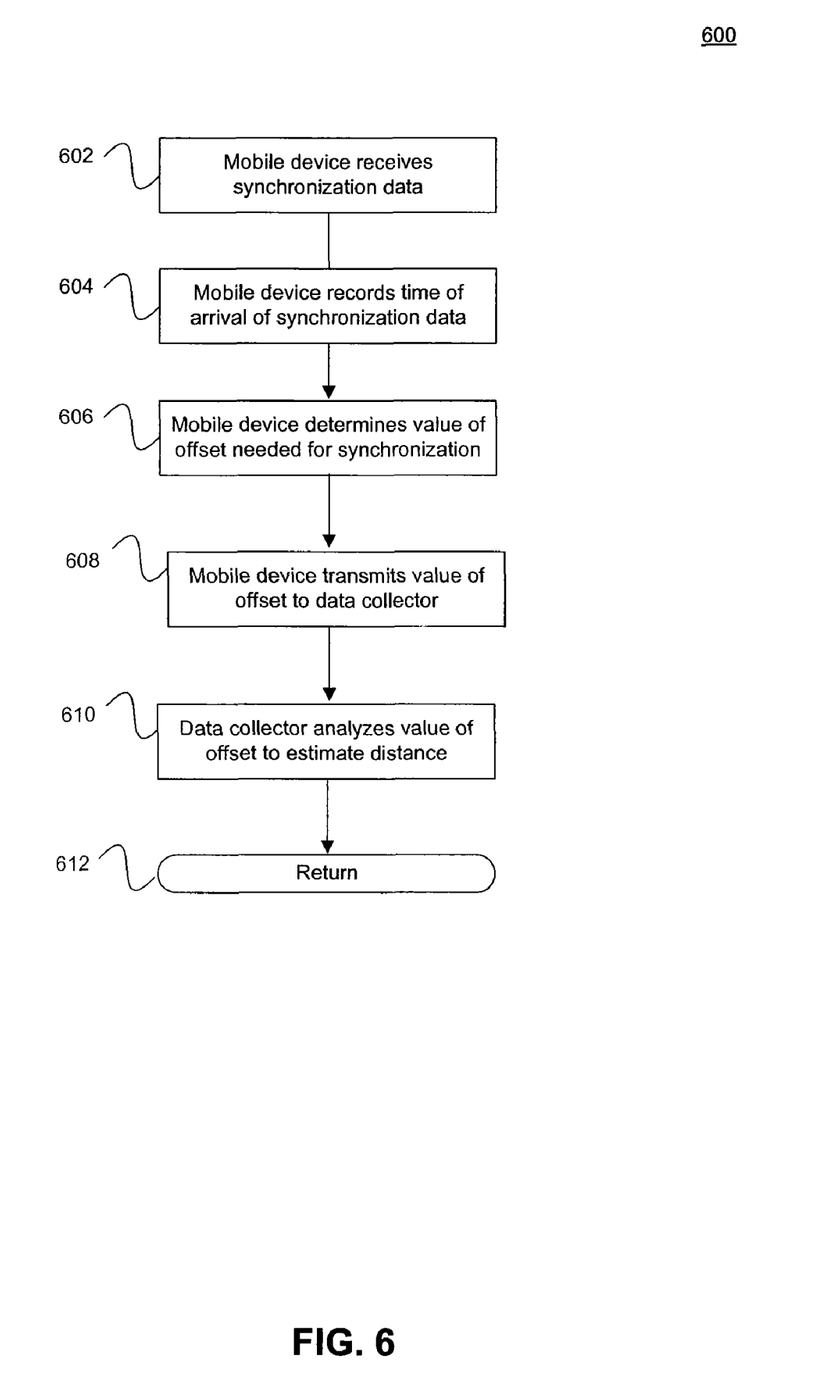
FIG. 6 is a flowchart illustrating a method of determining distance of a wireless base station from a centroid of data samples in an embodiment of the invention.

In another embodiment, method 600, illustrated in FIG. 6, may be used for determining the distance of a wireless base station in an embodiment of the invention. Method 600 begins with a mobile device receiving synchronization data from a wireless base station (stage 602). The mobile device records time of arrival of synchronization data (stage 604). The mobile device may then determine a value of offset that is required to synchronize itself with a wireless base station (stage 606). The mobile device then transmits a value of offset to a data collector (stage 608). The data collector may analyze the value of offset to estimate the distance of the mobile device from the wireless base station (stage 610) and method 600 concludes (stage 612).

In this way, distance between a mobile device 120*i* and a wireless base station 130*j* may be estimated. As an example, not intended to limit the invention, there is a linear relationship between an offset value and distance between mobile device 120*i* and wireless base station 130*j*.

VI. Direction Calculation

In an embodiment, phase detection algorithms may be used to estimate direction of a wireless base station 130*j* (where j may be any value from A though N) relative to the centroid of data samples. Estimation of direction, according to an embodiment, is explained below with reference to FIG. 7 and FIG. 8.

Figure 7:
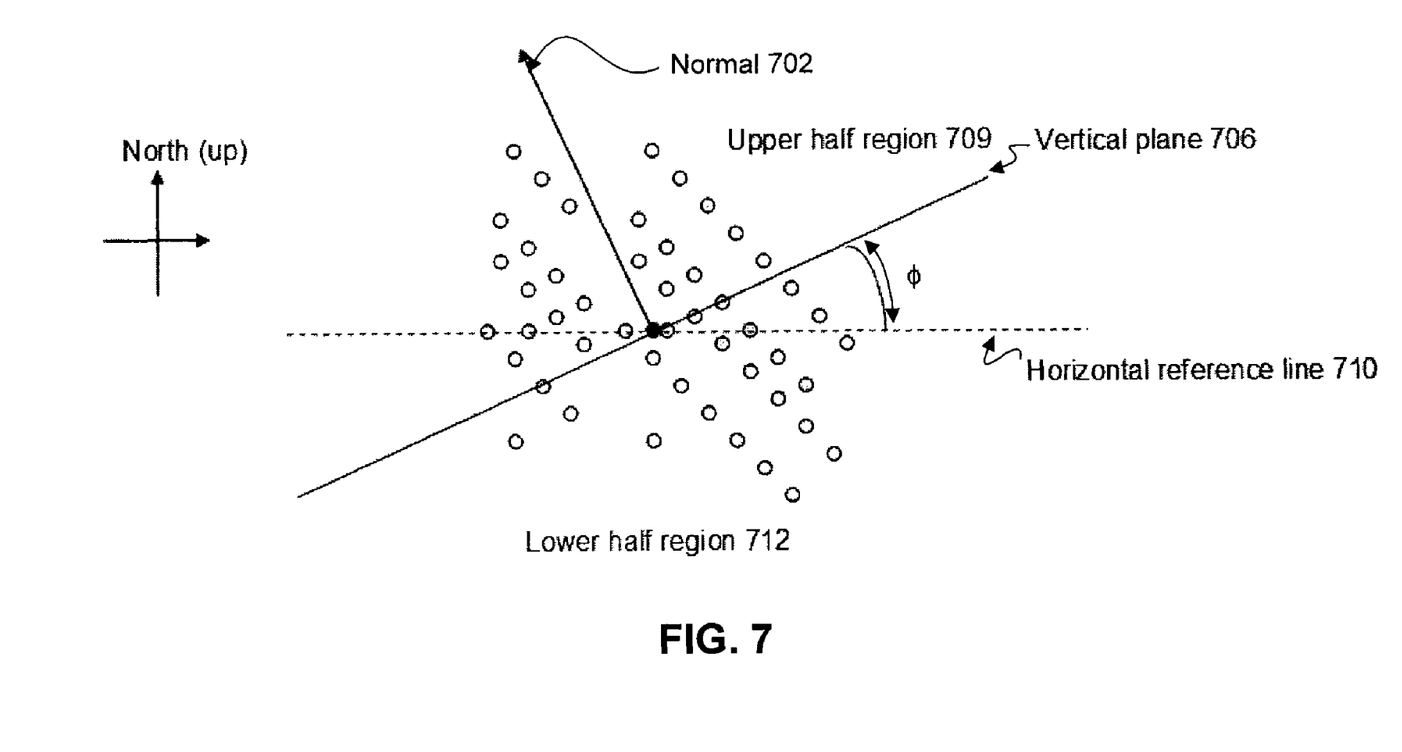
FIG. 7 is a diagram illustrating grouping of data samples in an embodiment of the invention.

FIG. 7 gives illustrates a horizontal reference line 710, vertical plane 706 which groups the data samples into upper half region 709 and lower half region 712 with its normal vector 702 (which is perpendicular to the vertical plane 706) pointing to the upper half region 709 of the data samples.

Figure 8:
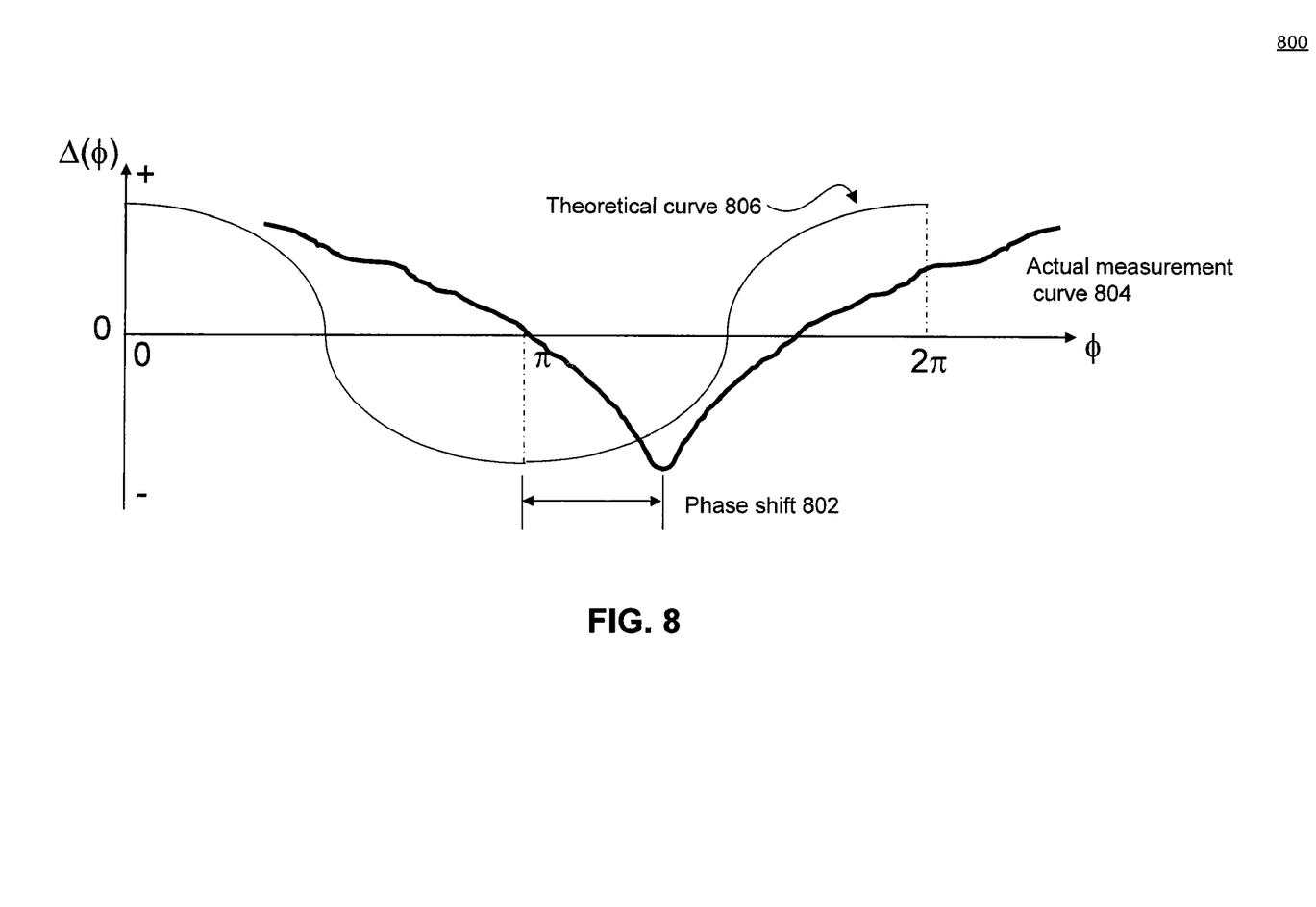
FIG. 8 is a diagram illustrating use of theoretical and actual measured curves to compute phase shift in an embodiment of the invention.

FIG. 8 illustrates a function plot to show how the direction of the tower is estimated in an embodiment. $\Delta(\phi)$ measures the difference between the average signal strength of a upper half region and that of a lower half, as a function of the $\phi$. $\phi$ represents an angular measurement by which a vertical plane has rotated around a centroid in reference to the horizontal reference line.

As an example, at first, a theoretical sinusoidal curve (assuming a wireless base station 130*j* (where j may be a value from A through N) is at the North (up) direction of the centroid) is plotted. Then the actual functional curve based on data samples obtained from mobile device(s) 120A-N is plotted.

A phase detecting algorithm may be used to determine a value of the phase shift 802 in a between the theoretical curve 806 and an actual measured curve 804. In an embodiment, phase calculator 216 in data collector 140 may determine phase shift 802. The value of phase shift 802 between theoretical curve 806 and actual measured curve 804 may represent the maximum likelihood line-of-sight direction between the wireless base station and a centroid of data samples.

Furthermore, the difference in the phase (or phase shift) allows phase calculator 216 to estimate an angle between the an estimated location of wireless base station 130$j$ from the centroid and a north (up) direction. In an embodiment, phase calculator 216 performs a convolution between theoretical curve 806 and the actual measured curve 804 to compute a maximum likelihood phase shift.

In this way, an estimate of the direction of a wireless base station 130$j$ may be determined.

VII. Use of Signal Propagation Models

In an embodiment, data collector 140 may use different propagation models based on actual properties of wireless signals traveling between mobile device(s) 120A-N and wireless base station 130$j$ (where j may be any value from A through N) to improve of an estimation of the location of the wireless base station 130$j$.

VIII. Other Methods and Validation a. Vector Based Estimation

In this section, systems and methods are described that enable estimation of location of a wireless base station 130$j$ (where j may be any value from A through N), when data from mobile device(s) 120A-N may not be available.

In an embodiment, wireless signals transmitted by wireless base station 130$j$ may be represented as vector(s) characterized by a magnitude and direction. Furthermore, if information comprised in data samples is represented as a vector originating from a centroid of the data samples in a plane, and the vector is pointing towards the direction of the estimated location of a wireless base station 130$j$, the length of this vector may be used to estimate the distance of a wireless base station 130$j$ from a centroid of data samples.

In an embodiment, such vectors may be plotted from a plurality of centroids on a plane. These plotted vectors may then be used to refine or validate a location estimate of wireless base station 130$j$. Vector(s) used for estimating the location of a wireless base station 130$j$ may be selected based on magnitudes of signal strengths represented by the vector(s).

Figure 9:
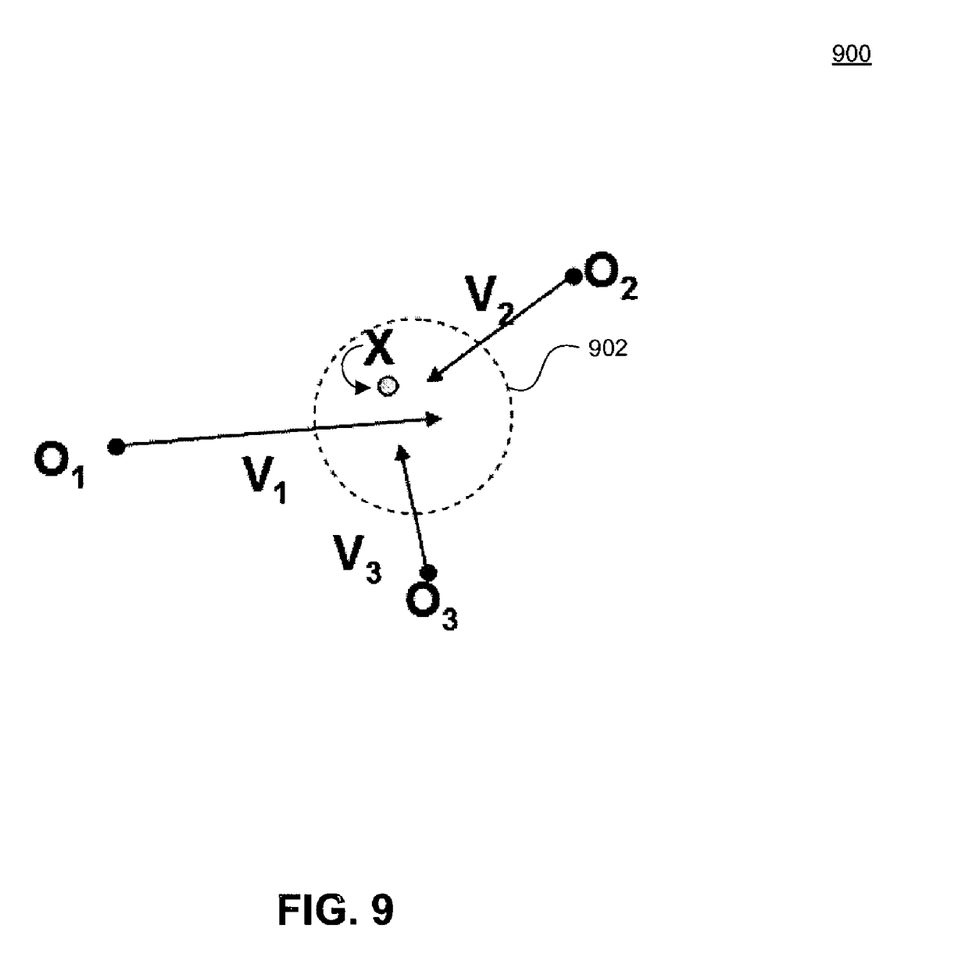
FIG. 9 is a diagram illustrating vector based location estimation in an embodiment of the invention.

Referring to FIG. 9, $O_iV_i$ (where i may be any integer) is a vector in an embodiment, such that, its origin is at a computed centroid of data samples, its length reflects the distance estimation, and its direction reflects the direction estimation.

In an embodiment, vector $O_iV_i$ is plotted on a two dimensional plane. As an example, i ranges from 1 to 3 in FIG. 9. Region 902 illustrates the potential location of the wireless base station 130$j$ where the three vectors $O_1V_1$, $O_2V_2$ and $O_3V_3$ (illustrated for exemplary purposes) are pointing.

In an embodiment of vector based estimation, data collector 140 determines a location X that satisfies a minimum value of the following condition:

$$\sum_i \frac{w_a(\angle XO_iV_i)^\alpha + w_d\|XV_i\|^\beta}{\|O_iV_i\|}$$

where

α and β are exponential coefficients $w_a$ is weight coefficient for angular error $w_d$ is weight coefficient for distance error b. Voronoi Based Estimation When mobile device(s) communicate in network 100, they may transmit to a wireless base station 130$j$ that provides the highest signal strength or RSSI value to a mobile device(s) 120A-N.

In an embodiment, information of these signal strengths or RSSI values is collected. Signal strength and RSSI information is then used by Voronoi generator 218 to determine a Voronoi estimation of the location of wireless base station 130$j$. The Voronoi estimation of the location of wireless base station 130$j$ (where j may be any value form A through N) may be based on the different centroid values.

In another embodiment, a Voronoi diagram may be plotted and the point of intersection of neighboring Voronoi cells may be the estimated location of wireless base station 130$j$. Such an estimation based on Voronoi diagrams may be used to validate the location of wireless base station 130$j$ estimated by methods described earlier in the description.

Figure 10:
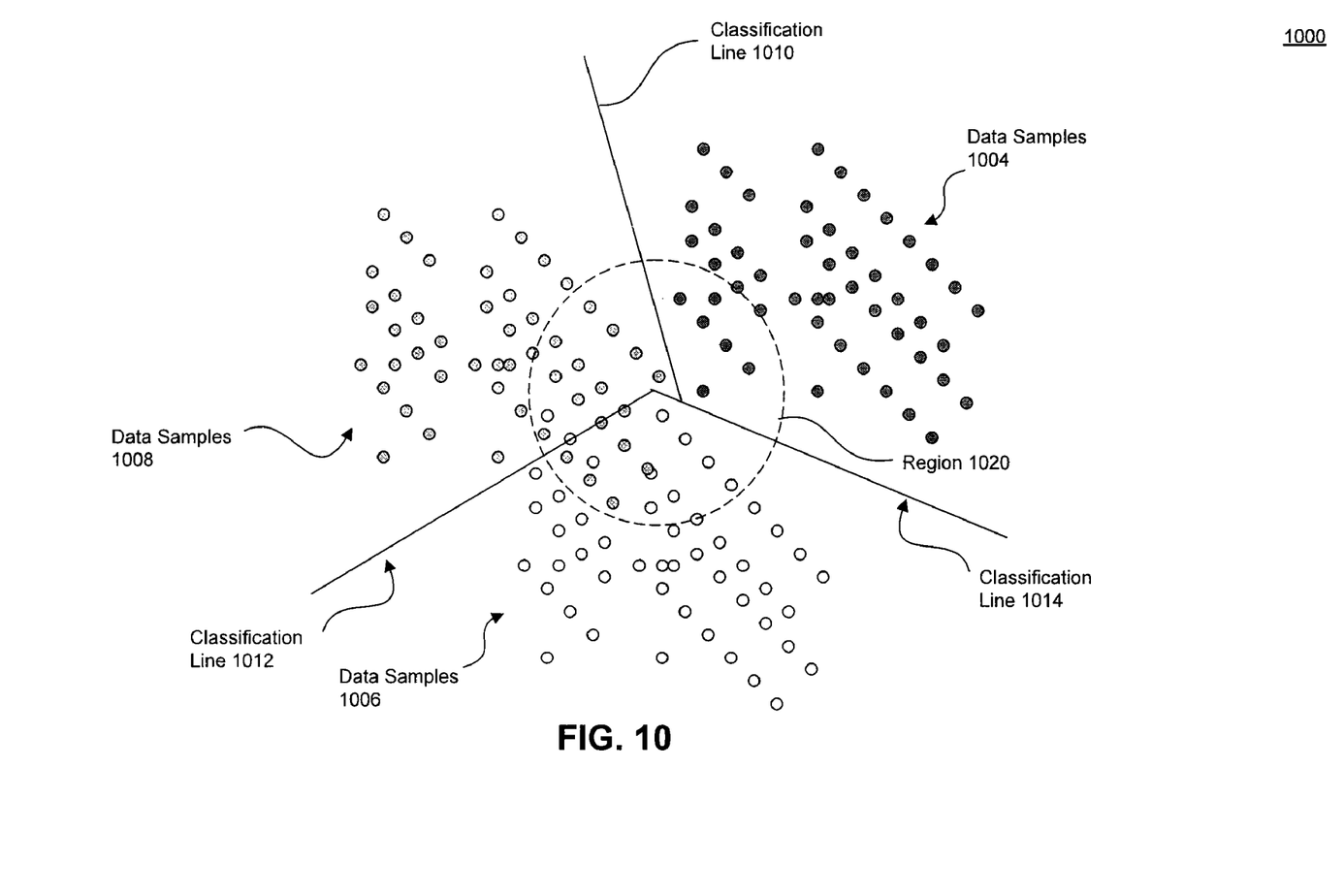
FIG. 10 is a diagram illustrating Voronoi based location estimation in an embodiment of the invention.

Referring to FIG. 10, each classification line 1010-1014 demarcates a unique CID. Classification lines 1010-1014 classify adjacent data samples 1008, 1004 and 1006 minimizing an error of classifying spatial data samples 1004, 1006 and 1008 to the other side of the classification line which reports a different CID.

In an embodiment, by connecting all the classification lines 1010-1014, a Voronoi diagram is generated by Voronoi generator 218. Region 1020 bounding the intersections may allow data collector 140 to predict the existence of a wireless base station 130$j$ and may be used to validate the results of vector based estimation. Additionally offset, signal strength or other essential information may be used when available.

As discussed herein, the location of a given wireless base station 130A-N may be based on a number of measurements taken by one or more mobile devices 120A-N. The raw data collected by a mobile device may be processed locally or sent to a central repository (e.g., data collector 140 of FIG. 1) for processing. Regardless of which device performs the calculations, each distance and/or each location estimate may be stored in a database, for instance as part of a location table. The location table may store, for one or more wireless base stations 130A-N, a unique identifier for the wireless base station (such as a MAC address, IP address or SSID), a location estimate (e.g., latitude and longitude coordinates and/or height), a time the location estimate was obtained/calculated, a coverage radius for the wireless base station 130A-N, a confidence for the location estimate (e.g., 90% likely to be within 50 meters of the specific position), equipment type (e.g., transceiver make/model) and/or RSSI information. If multiple location measurements are made, some or all of them may be stored in the location table. The use of a confidence value for a location estimate and the use of a location table is described further in U.S. Provisional Patent Application No. 61/196,167, filed on Oct. 15, 2008, entitled "Wireless Network-Based Location Approximation", which is incorporated herein by reference in its entirety.

IX. Example Computer Embodiment

Figure 11:
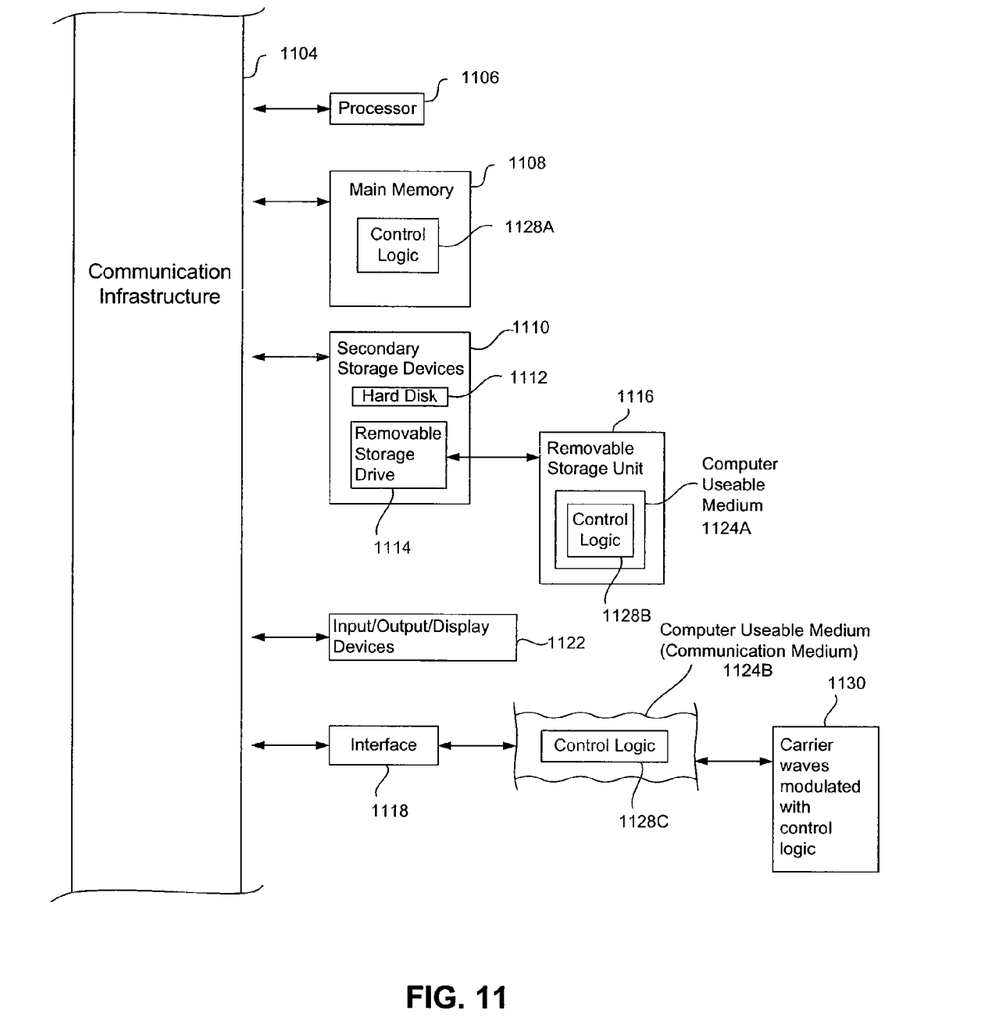
FIG. 11 illustrates an example computer useful for implementing components of embodiments of the invention.

In an embodiment of the present invention, the system and components of embodiments described herein are implemented using well known computers, such as example computer 1102 shown in FIG. 11. For example, data collector 140 can be implemented using computer(s) 1102 programmed with the appropriate software to execute the logic of FIGS. 3, 4 and 6.

The computer 1102 can be any commercially available and well known computer capable of performing the functions described herein, such as computers available from International Business Machines, Apple, Sun, HP, Dell, Compaq, Digital, Cray, etc.

The computer 1102 includes one or more processors (also called central processing units, or CPUs), such as a processor 1106. The processor 1106 is connected to a communication infrastructure 1104.

The computer 1102 also includes a main or primary memory 1108, such as random access memory (RAM). The primary memory 1108 has stored therein control logic 1121 1A (computer software), and data.

The computer 1102 also includes one or more secondary storage devices 1110. The secondary storage devices 1110 include, for example, a hard disk drive 1112 and/or a removable storage device or drive 1114, as well as other types of storage devices, such as memory cards and memory sticks. The removable storage drive 1114 represents a floppy disk drive, a magnetic tape drive, a compact disk drive, an optical storage device, tape backup, etc.

The removable storage drive 1114 interacts with a removable storage unit 1116. The removable storage unit 1116 includes a computer useable or readable storage medium 1124 having stored therein computer software 1128B (control logic) and/or data. Removable storage unit 1116 represents a floppy disk, magnetic tape, compact disk, DVD, optical storage disk, or any other computer data storage device. The removable storage drive 1114 reads from and/or writes to the removable storage unit 1116 in a well known manner.

The computer 1102 also includes input/output/display devices 1122, such as monitors, keyboards, pointing devices, etc.

The computer 1102 further includes a communication or network interface 1118. The network interface 1118 enables the computer 1102 to communicate with remote devices. For example, the network interface 1118 allows the computer 1102 to communicate over communication networks or mediums 1124B (representing a form of a computer useable or readable medium), such as LANs, WANs, the Internet, etc. The network interface 1118 may interface with remote sites or networks via wired or wireless connections.

Control logic 1128C may be transmitted to and from the computer 1102 via the communication medium 1124B. More particularly, the computer 1102 may receive and transmit carrier waves (electromagnetic signals) modulated with control logic 1130 via the communication medium 1124B.

Any apparatus or article of manufacture comprising a computer useable or readable medium having control logic (software) stored therein is referred to herein as a computer program product or program storage device. This includes, but is not limited to, the computer 1102, the main memory 1108, secondary storage devices 1110, the removable storage unit 1116 and the carrier waves modulated with control logic 1130. Such computer program products, having control logic stored therein that, when executed by one or more data processing devices, cause such data processing devices to operate as described herein, represent embodiments of the invention.

Embodiments of the invention can work with software, hardware, and/or operating system implementations other than those described herein. Any software, hardware, and operating system implementations suitable for performing the functions described herein can be used. Embodiments of the invention are applicable to both a client and to a server or a combination of both.

The Summary and Abstract sections may set forth one or more but not all exemplary embodiments of the present invention as contemplated by the inventor(s), and thus, are not intended to limit the present invention and the claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A method for identifying a location of a wireless base station, comprising:
    obtaining data samples from one or more mobile devices;
    acquiring signal strength information in the data samples;
    analyzing timing information in the data samples to determine at least one of a synchronization offset and a value of distance;
    plotting one or more of the data samples on a multi-dimensional plane;
    computing a centroid of the data samples;
    computing a first curve based on a location of the wireless base station;
    computing a second curve based on the data samples obtained from the one or more mobile devices;
    determining a phase shift between the first curve and the second curve;
    computing an angle between a location of the wireless base station and the centroid using at least the phase shift;
    determining a direction of the wireless base station from one of the mobile devices using the phase shift and the angle; and
    outputting a signal to the one or more mobile devices, the signal corresponding to the location of the wireless base station.

2. The method of claim 1, wherein the first curve and the second curve are sinusoidal curves.

3. The method of claim 1, wherein the first curve is based on a location of the wireless base station at a direction north of the centroid.

4. The method of claim 1, wherein the phase shift is determined based on at least a convolution between the first curve and the second curve.

5. The method of claim 1, wherein the phase shift is based on one or more signal propagation models.

* * * * *